United States Patent [19]
Tsujimoto

[11] 3,831,180
[45] Aug. 20, 1974

[54] ELECTRICAL EXPOSURE CONTROL DEVICE FOR SINGLE LENS REFLEX CAMERAS

[75] Inventor: Kayoshi Tsujimoto, Osaka, Japan

[73] Assignee: Minolta Camera Kabushiki Kaisha, Osaka-shi, Osaka-fu, Japan

[22] Filed: Oct. 30, 1972

[21] Appl. No.: 301,844

Related U.S. Application Data

[63] Continuation of Ser. No. 90,888, Nov. 19, 1970, abandoned.

[52] U.S. Cl. .................................................. 354/51
[51] Int. Cl. .................................................. G03b 7/08
[58] Field of Search ..................... 95/10 CE, 10 CT

[56] References Cited
UNITED STATES PATENTS

| | | | |
|---|---|---|---|
| 3,324,779 | 6/1967 | Nobusawa et al. | 95/10 X |
| 3,442,190 | 5/1969 | Erickson | 95/10 |
| 3,502,010 | 3/1970 | Kennel | 95/10 |
| 3,504,611 | 4/1970 | Richter et al. | 95/10 X |

FOREIGN PATENTS OR APPLICATIONS

4,419,747  8/1969  Japan

*Primary Examiner*—Richard M. Sheer
*Assistant Examiner*—Michael L. Gellner
*Attorney, Agent, or Firm*—Watson, Cole, Grindle & Watson

[57] ABSTRACT

First and second switch mechanisms are connected in series between means for generating an output voltage corresponding to detected light and means for storing that output voltage. The first switch is opened upon actuation of a shutter release member and the second switch is opened upon actuation of the reflex mirror from a viewing position to an exposure position. The diaphragm aperture is preset to a desired value and stopped-down from full aperture to that desired value prior to the initiation of film exposure such that the second switch is opened by the stopping-down of the diaphragm aperture in synchronization with the operation of the reflex mirror.

2 Claims, 3 Drawing Figures

ELECTRICAL EXPOSURE CONTROL DEVICE FOR SINGLE LENS REFLEX CAMERAS

This is a continuation, of application Ser. No. 90,888, filed Nov. 19, 1970, now abandoned.

The present invention relates to an electrically controlled shutter in a photometric system for light passing through the objective lens (TTL) and more particularly to a camera provided with an electrically controlled shutter, wherein the photometric circuit is responsive to the light rays passing through the objective lens before the shutter release operation is effected. A memory element stores the photometric value to control the control circuit for the electrically actuated shutter in interlocking relationship with the shutter release operation and subsequently the storage of the photometric value continues.

BACKGROUND OF THE INVENTION:

Up to the present time, in a camera provided with a TTL electric shutter a light receiving element is provided in the optical path of the picture image passing through the objective lens, so that when exposed the light receiving element is recessed from the picture image optical path. Or as in a single lens reflex camera, by changing over the camera from the observation condition to the photographic condition by means of the movable mirror the light receiving element is disposed in the finder optical path thereof.

Therefore, it is impossible to conduct photometry during exposure, so that before the shutter release is effected the brightness of an object measured by the light receiving element is stored by the memory element. The memory element is disconnected from the photometric circuit in interlocking relationship with the shutter release operation. Moreover the change over of the memory element is interlocked only with the shutter release operation so as to control the exposure by the stored photometric value. However in such an arrangement, when the shutter release operation is discontinued during exposure the memory element is connected again to the photometric circuit resulting in misoperation of the control circuit for the electric shutter. Such a happening may not occur so often when the brightness of an object is high and the exposure time is short but it occurs very often when the brightness is low and the exposure time is long.

OBJECT OF THE INVENTION

One object of the present invention is to eliminate the prior drawbacks mentioned above and to prevent the memory element from returning to connect with the photometric circuit until the exposure control is finished.

Another object of the present invention is to provide a camera having an electric shutter of the TTL photometric type, wherein a memory element connected to the photometric circuit is disconnected therefrom in interlocking relationship with the shutter release operation at its initial stroke, and after the exposure control is started with the stored value of the memory element the control is continued thereby regardless of the return of the release operation until the exposure control is finished.

Further another object of the present invention is to provide a positive disconnection of the memory element from the photometric circuit in interlocking relationship with the shutter release operation at its initial stroke and in interlocking relationship with the shutter release operation from the observation condition to the photographic condition until the exposure is finished.

Other objects and advantages of the present invention will be apparent by the embodiments thereof described hereinafter.

SUMMARY OF THE INVENTION:

In order to attain the objects mentioned above, the present invention relates to a camera provided with an electric shutter comprising a control circuit composed of a photometric circuit including a photoconductive element, a voltage memory element, and an exposure control electromagnet controlled by the stored value of the memory element. First and second switches are interposed between the photometric circuit and the memory element and connected in series to each other. The first switch is opened and closed in interlocking relationship with the shutter release operation at its initial stroke. The second switch is opened in interlocking relationship with the shutter mechanism operated by the shutter release operation and its opening state is continued at least until the exposure effected by the electric shutter controlled by the control circuit is finished.

Figure 1:
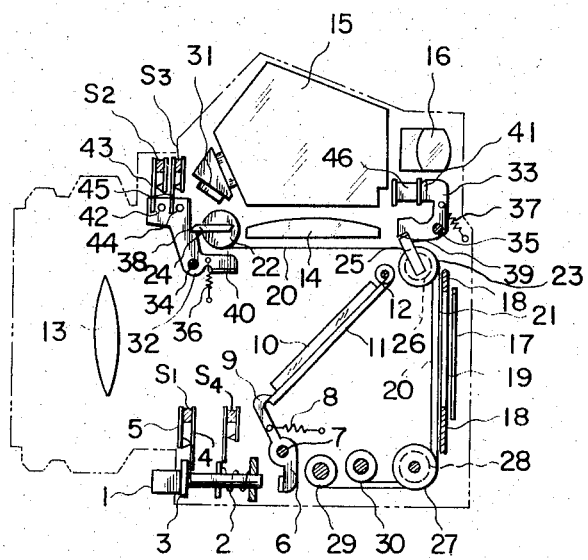
FIG. 1 is a side view of an embodiment of the single lens reflex camera in accordance with the present invention.

DESCRIPTION OF THE PREFERRED EMBODIMENT:

FIG. 1 is a side view showing an embodiment of the single lens reflex camera in accordance with the present invention, wherein a housing for the camera body and lens barrel is shown by a chain line. Release button 1 projecting from the camera housing is forced outwardly by spring 2, and contact 4 of switch S, having the closing tendency engages with flange 3. Contact 4 connects with and disconnects from contact 5 in interlocking relationship with the release operation of release button 1. When release button 1 is pushed in, power switch $S_4$ (described later) is closed, and then switch $S_1$ is opened. Mirror lever 6 is pivoted on pin 7 to a position to engage with the rear end of release button 1 and its pawl 9 carries movable mirror 10 through spring 8. Plate 11 turnable on pin 12 and given the clockwise turning tendency by a spring (not shown in the drawing) has the tendency to engage with pawl 9 when movable mirror 11 is located at the position inclined 45° relative to the optical axis of the objective lens 13.

Thus, just as switch $S_1$ is opened by the release operation of release button 1, release button 1 engages with mirror lever 6 to turn it counter-clockwise against spring 8, so that pawl 9 is disengaged from turning plate 11. Thereby, turning plate 11 and movable mirror 10 turn clockwise from the position inclined 45° relative to the optical axis of the objective lens 13 to the horizontal position.

When movable mirror 10 is inclined 45°, the light rays incident from the objective lens 13 are reflected upward by movable mirror 10 and projected onto focusing glass 14. The image thereof is projected to eyepiece 16 through pentagonal prism 15. Simultaneously, photoelectric element 31 disposed on the reflecting face of pentagonal prism 15 receives a portion of the light rays. That is, the camera is in the observation condition to enable the object to focus and the photometric value effected by the photometric circuit is transmitted to the memory capacitor.

The turning to the horizontal position of turning plate 11 changes over the camera from the observation condition to the photographic condition and the incident rays from the objective lens 13 are projected and photographed on sensitive film 17 passing through exposure opening 19 of exposure frame opened through opening screen 20 and closing screen 21 for the focal plane shutter.

At the final movement of turning to the horizontal position of turning plate 11, opening screen restraining lever 32 provided with face 40 for engaging with turning plate 11 is connected to a pin mounted on the camera body through pin hole 34 and given the clockwise turning tendency by spring 36 to keep face 40 in the engaging position with turning plate 11. Opening screen restraining lever 32 is provided with notched engage portion 38 and two pins 42 and 44. To notched engage portion 38 one end of opening screen 20 is secured, and pawl 24 of opening screen winding drum 22 can engage with notched engage portion 38 at the position where winding of the opening screen is finished. Pin 42 engage with movable contact 44 of switch $S_2$ having a closing tendency, and pin 44, in the same way engage movable contact 45 of timing switch $S_3$ having a closing tendency for short-circuiting delay condenser $C_2$.

Opening screen 20 is secured on its one end to opening screen winding drum 22 as described hereinbefore and passes through the front of exposure frame 18 via turning roller 26, and then via turning roller 28 is wound around opening screen take-up reel 30.

Also, closing screen 21, one end of which is secured to closing screen winding drum 23, passes between opening screen 20 and exposure frame 18, and via turning roller 27 the other end is wound around closing screen take-up reel 29.

Closing screen winding drum 23 is provided with pawl 25 which engages at the position where winding is finished with notched engage portion 39 of closing screen restraining lever 33 connected by a pin mounted on the camera body through pin hole 35 and given the clockwise turning tendency by spring 37. Armature 41 provided fixedly on the other end of closing screen restraining lever 33 faces electromagnet 46 inserted in the output circuit of the control circuit (described later), and when attracted by electromagnet 46 closing screen restraining lever 33 restrains pawl 25.

Turning plate 11 is returned to the position inclined 45°, in the same manner as in the known single lens reflex camera, in interlocking relationship with a quick return mechanism (not shown in the drawing) or with the turning of the film winding lever, after the exposure is finished. And, opening screen 20 and closing screen 21 for the focal plane shutter are wound around winding drums 22, 23 respectively in interlocking relationship with winding up the film and restrained at the winding position by restraining levers 32, 33 respectively.

Figure 2:
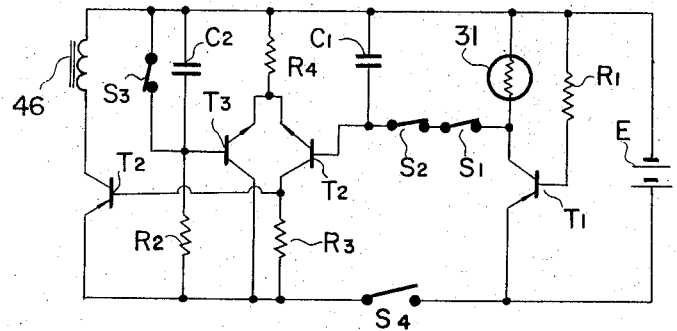
FIG. 2 is an electric circuit diagram of a control circuit for that embodiment.

With reference to FIG. 2 showing the electric circuit, power switch $S_4$ is closed prior to the release operation and the emitter and the collector of transistor $T_1$ are connected in parallel to power source E. In the collector photoconductive element 31 is inserted, and the base of said transistor $T_1$ is connected to the negative side of power source E via fixed resistance $R_1$ and applied with a fixed bias. Therefore, the collector current of transistor $T_1$ has a constant value I regardless of the collector voltage. That is, transistor $T_1$ functions as a constant-current source. Accordingly, the voltage drop of photoconductive element 31 undergoes a change in accordance with the resistance value $R_0$ of photoconductive element 31 itself, therefore, $V=IR_0$ Provided the voltage of power source battery E is $E_0$, voltage V is $0<V$ $E_0$, and in this limit voltage V is in proportion to resistance value $R_0$. And, resistance value $R_0$ depends upon the lightness of an object, so that voltage V can be used for setting up the exposure time.

Then, for a memory element, memory capacitor $C_1$ is used. FIG. 2 shows the state prior to the depression of shutter release button 1, namely, prior to the effecting of the release operation, so that first switch $S_1$ and second switch $S_2$ for connecting photoconductive element 31 to memory capacitor $C_1$ are closed. In the prior stroke or the first stroke in which shutter release button 1 is pushed, power switch $S_4$ is closed, and the photometry is started, and voltage V corresponding to the lightness of an object is present between both terminals of photoconductive element 31. At this juncture, first and second switches $S_1$, $S_2$ are still closed, so that voltage V is stored in memory capacitor $C_1$.

The exposure time control circuit comprises a differential amplifier composed of transistor $T_2$ and transistor $T_3$, and a time constant circuit composed of delay capacitor $C_2$ and delay resistance $R_2$. Delay capacitor $C_2$ and timing switch $S_3$ connected in parallel. Capacitor $C_1$ is connected to the base of transistor $T_2$, and the collector of transistor $T_2$ is connected to the base of amplifier transistor $T_4$ and the positive side of power source E through resistance $R_3$. And, the emitter of transistor $T_2$ is connected to the negative side of power source E together with the emitter of transistor $T_3$ via resistance $R_4$, and to the base of transistor $T_3$ a node of RC time constant circuit is connected. In the collector of amplifier transistor $T_4$ electromagnet 46 is inserted.

Therefore, just as shutter release button 1 is further depressed, first switch $S_1$ opened/closed in interlocking relationship with shutter release button 1 is opened, and memory capacitor $C_1$ is cut off from the photometric circuit to store the voltage just prior to the disconnection of the photometric circuit. Then, shutter release button 1 turns mirror lever 6 counter-clockwise against spring 8, mirror lever 6 is disengaged from turning plate 11, and movable mirror 10 and turning plate 11 turn to the horizontal position and at their final stroke turn opening screen restraining lever 32 counter-clockwise against spring 36. And thus, pins 42, 44 open switches $S_2$, $S_3$ respectively and at the same time notched portion 38 is disengaged from pawl 24, opening screen 20 is pulled by take-up reel 30 to start to run, and the shutter opening is started.

Movable mirror 10 and turning plate 11 remain in the horizontal position until the exposure is finished, so as to keep the camera in the photographic condition, therefore, the opening of second switch $S_2$ is maintained until the exposure is finished. And even though the pushing of release button 1 is stopped while in exposure operation and first switch $S_1$ is closed, memory capacitor $C_1$ is by no means connected again to the photometric circuit. Second switch $S_2$ is opened and simultaneously timing switch $S_3$ is opened, and delay capacitor $C_2$ starts to charge by the current running through delay fixed resistance $R_1$. When the charging voltage of delay capacitor $C_2$ coincides with the stored voltage of memory capacitor $C_1$ transistors $T_2$, $T_3$ are reversed, the collector current of amplifier transistor $T_4$ is shut off, and electromagnet 46 is demagnetized, so that closing screen restraining lever 33 is turned by spring 37 to release the restraining of pawl 25 and closing screen 21 is pulled by take-up reel 29 to start to run and the shutter closing is started.

Figure 3:
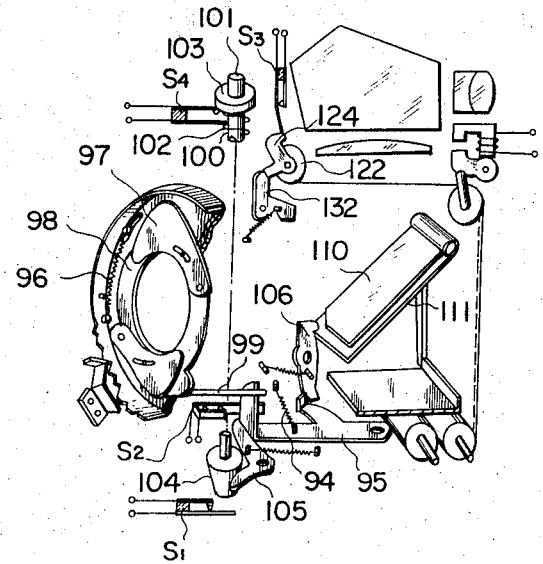
FIG. 3 is a partial perspective view of another embodiment in accordance with the present invention.

FIG. 3 shows the second embodiment in accordance with the present invention, wherein second switch $S_2$ is opened in interlocking relationship with the automatic stop down mechanism of the preset diaphragm started in interlocking with the shutter release operation.

In FIG. 3, there is provided shutter release rod 100 given the ascending tendency by spring 102 and provided with release button 101, flange 103, and conical driving cam 104. Also there are provided power switch $S_4$ closed by flange 103 at the first stroke of pushing release button 101 and having an opening tendency, first switch $S_1$ opened by the subsequent descending stroke of shutter release rod 100 and having a closing tendency, and release lever 105 operated by driving cam 104 at the descending stroke of shutter release rod 100.

The turning of release lever 105 releases the restraining of automatic diaphragm operation lever 95 of the preset diaphragm, and diaphragm operation lever 95 releases the restraining of connection rod 99 of diaphragm ring 98 which engages with diaphragm operation lever 95 and stops down diaphragm blade 97 from its full opening state to the preset diaphragm value through spring 96. Simultaneously connection rod 99 opens second switch $S_2$ through spring 94 and operates mirror lever 106 to disengage it from movable mirror 110 and turning plate 111. Turning plate 111 turns opening screen restraining lever 132 to disengage it from pawl 124 of opening screen winding drum 122 so as to permit the opening screen to start to run, the simultaneously pawl 124 opens timing switch $S_3$.

It is understood from the description of the two embodiments mentioned above, in the present invention that two switches are provided in the circuit for connecting the photometric circuit to the memory element, and the first switch is opened and closed reversibly at the initial stroke of the shutter release operation in interlocking relationship with that operation, and the second switch is opened in interlocking relationship with the shutter mechanism started by the shutter release operation or the mechanism for starting the shutter mechanism, which functions irreversibly until the exposure is finished so as to change over the camera from the observation condition to the photographic condition. And after the exposure is once started the memory element controls the electric control circuit regardless of the release operation until the exposure is finished.

I claim:

1. An electrical exposure control device for a single lens reflex camera of the type wherein means are provided for actuating the reflex mirror from a viewing position to an exposure position comprising:
    setting means for presetting the diaphragm aperture to a desired value, said diaphragm aperture being stopped-down from full aperture to said desired value prior to the initiation of film exposure;
    means for detecting the light through an objective lens from an object;
    means for generating an output voltage corresponding to the light detected by said means for detecting;
    means for storing said voltage;
    first and second switches connected in series between said means for generating and said means for storing, means for opening said first switch in response to the shutter release operation, said second switch being opened by said stopping-down of said diaphragm aperture;
    means for determining the duration of an exposure as a function of the voltage stored by said means for storing; and
    means responsive to said means for determining the duration of an exposure for controlling the actual exposure time for the camera.

2. An electrical exposure control device for a single lens reflex camera of the type wherein means are provided for actuating the reflex mirror from a viewing position to an exposure position, comprising:
    means for detecting the light through an objective lens from an object;
    means for generating an output voltage corresponding to the light detected by said means for detecting;
    means for storing said voltage;
    a first and a second switch connected in series between said means for generating and said means for storing, said first switch is opened upon actuation of the shutter release member and said second switch is opened with said means for actuating the reflex mirror being operated;
    means for determining the duration of an exposure as a function of the voltage stored by said means for storing;
    means responsive to said means for determining the duration of an exposure for controlling the actual exposure time of the camera; and
    wherein said camera is provided with setting means for presetting the diaphragm aperture to a desired value, said diaphragm aperture is stopped-down from full aperture to said desired value prior to the initiation of film exposure, and said second switch is opened by said stopping down of said diaphragm aperture synchronized with the operation of the reflex mirror.

* * * * *